(12) United States Patent
Drolet

(10) Patent No.: US 9,690,110 B2
(45) Date of Patent: Jun. 27, 2017

(54) FINE-COARSE AUTOSTEREOSCOPIC DISPLAY

(71) Applicant: Apple Inc., Cupertino, CA (US)

(72) Inventor: Jean-Jacques Drolet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 14/602,221

(22) Filed: Jan. 21, 2015

(65) Prior Publication Data

US 2016/0212413 A1 Jul. 21, 2016

(51) Int. Cl.
| | |
|---|---|
| G02B 27/22 | (2006.01) |
| G09G 1/06 | (2006.01) |
| H04N 13/04 | (2006.01) |
| G09G 3/18 | (2006.01) |

(52) U.S. Cl.
CPC ........... *G02B 27/2214* (2013.01); *G09G 1/06* (2013.01); *H04N 13/0402* (2013.01); *H04N 13/0497* (2013.01); *G09G 3/18* (2013.01); *G09G 2340/0492* (2013.01)

(58) Field of Classification Search
CPC ............... H04N 13/0022; H04N 13/00; H04N 13/0003; H04N 13/0018
See application file for complete search history.

(56) References Cited

U.S. PATENT DOCUMENTS

| | | | |
|---|---|---|---|
| 6,533,420 B1 | 3/2003 | Eichenlaub | |
| 7,224,382 B2 | 5/2007 | Baker | |
| 2002/0015007 A1* | 2/2002 | Perlin | ................ G02B 27/2214 345/6 |
| 2002/0039229 A1* | 4/2002 | Hirose | ................... G03B 21/56 359/451 |
| 2002/0140899 A1* | 10/2002 | Blum | .................. G02B 27/017 351/159.03 |
| 2005/0286000 A1* | 12/2005 | Tsai | ...................... G02F 1/1323 349/119 |

(Continued)

FOREIGN PATENT DOCUMENTS

WO  WO2014/180554 A1  11/2014

OTHER PUBLICATIONS

Lewin, "Holographic Displays Coming to Smartphones," IEEE Spectrum, Jul. 16, 2014 (pp. 1-3) [Retrieved on Apr. 22, 2015]. Retrieved from the Internet: <http://spectrumieee.org/consumer-electronics/audiovideo/holographic-displays-coming-to-smartphones>.

*Primary Examiner* — Kent Chang
*Assistant Examiner* — William Lu
(74) *Attorney, Agent, or Firm* — Treyz Law Group, P.C.; G. Victor Treyz; Zachary D. Hadd

(57) ABSTRACT

A device may have a display with an array of pixels for displaying three-dimensional images for a viewer. Each pixel may have an array of subpixels and associated lens structures. A beam steerer may be interposed between the array of pixels and the viewer. The beam steerer may steer light that is emitted from the array of pixels towards the viewer. The electronic device may have a camera that monitors the location of the viewer. The beam steerer may be adjusted based on information on the location of the viewer that is gathered from the camera. Other input-output devices such as an accelerometer may also be used in gathering information that is used in adjusting the beam steerer. Different sets of data may be supplied to the array of pixels based on the location of the viewer.

4 Claims, 8 Drawing Sheets

(56) References Cited

U.S. PATENT DOCUMENTS

| | | | |
|---|---|---|---|
| 2007/0103547 A1* | 5/2007 | Kim | G09G 3/003 348/55 |
| 2010/0149073 A1* | 6/2010 | Chaum | G02B 27/0093 345/8 |
| 2011/0128356 A1* | 6/2011 | de la Barre | G09G 3/003 348/54 |
| 2011/0157339 A1* | 6/2011 | Bennett | G06F 3/14 348/59 |
| 2011/0234605 A1* | 9/2011 | Smith | G02B 27/2214 345/522 |
| 2012/0130257 A1* | 5/2012 | Heanue | A61B 5/0059 600/476 |
| 2012/0236127 A1* | 9/2012 | Ojala | H04N 13/0239 348/47 |
| 2013/0050440 A1* | 2/2013 | Kaseno | H04N 13/04 348/51 |
| 2013/0050441 A1* | 2/2013 | Kumagai | H04N 13/0468 348/51 |
| 2013/0063496 A1* | 3/2013 | Basler | H04N 13/0404 345/690 |
| 2013/0181892 A1* | 7/2013 | Liimatainen | G06F 3/011 345/156 |
| 2013/0245754 A1* | 9/2013 | Blum | A61F 2/1627 623/6.13 |
| 2013/0307831 A1* | 11/2013 | Robinson | G02B 6/0068 345/207 |
| 2014/0022219 A1* | 1/2014 | Kim | G02B 27/2214 345/204 |
| 2014/0204333 A1* | 7/2014 | Blum | G02C 7/061 351/55 |
| 2014/0285643 A1* | 9/2014 | Usukura | G02B 27/2214 348/59 |
| 2014/0300711 A1 | 10/2014 | Kroon et al. | |
| 2014/0333735 A1* | 11/2014 | Bathiche | H04N 13/0404 348/54 |
| 2015/0192780 A1* | 7/2015 | Guo | G02B 5/005 359/462 |
| 2015/0293497 A1* | 10/2015 | Song | G03H 1/2286 359/9 |

\* cited by examiner

FINE-COARSE AUTOSTEREOSCOPIC DISPLAY

BACKGROUND

This relates generally to displays, and, more particularly, to autostereoscopic displays.

Electronic devices often include displays. Three-dimensional displays are able to display images that have a three-dimensional appearance. Autostereoscopic displays can display three-dimensional images without requiring viewers to wear special glasses.

Three-dimensional displays present different images to a viewer's right and left eyes, giving displayed images a three-dimensional appearance. Challenges can arise in creating high quality three-dimensional displays. When a user views an object, the user's eyes pivot in opposite directions until the user's eyes both point towards the object. At the same time, the lenses of the user's eyes are adjusted to focus on the object. When viewing real-life objects, there is an inherence congruence between the viewer's eye motions (vergence) and location of focus (accommodation). Without appropriate vergence accommodation congruence, a viewer may experience discomfort when viewing a three-dimensional display.

Autostereoscopic displays have been developed that enable vergence accommodation congruence while viewing three-dimensional objects. Such displays include pixels that are capable of emitting light in any of a number of different directions. By controlling both the spatial location of each active pixel and the angular orientations of emitted light rays from each of these pixels, three-dimensional images can be displayed without causing discomfort for a viewer.

The ability to control the directions in which light rays are emitted from each pixel generally requires the use of subpixels in each pixel. The angles of the emitted light rays from the pixel are controlled by controlling the amount of light emitted from each of the subpixels. The subpixels in each pixel may be organized in a two-dimensional array. This consumes display real estate which reduces pixel density and display resolution.

There is therefore a tradeoff involved. More angular control of the emitted light may help to enhance vergence accommodation congruence, but requires that each pixel include an enlarged two-dimensional array of light-emitting subpixels. When less angular control is provided, pixel complexity may be reduced and display resolution may be enhanced, but viewing angles will decrease and the ability for a viewer to look around objects in a displayed three-dimensional will suffer.

It would therefore be desirable to be able to provide an improved autostereoscopic display.

SUMMARY

An electronic device may be provided with an autostereoscopic display. The display may have an array of pixels that display three-dimensional images for a viewer. Each pixel may have an array of subpixels and associated lens structures for emitting light at different angles.

A beam steerer such as a liquid crystal beam steerer may be interposed between the array of pixels and the viewer. The beam steerer may steer light that is emitted from the array of pixels towards the viewer. This increases the range of angles from which the display may be viewed.

Different sets of data may be supplied to the array of pixels based on the location of the viewer and the associated beam steerer setting. This allows the displayed three-dimensional images to have an appearance that is appropriate when viewed from the point-of-view of an observer at the viewer's location.

The electronic device may have a camera that monitors the location of the viewer. The beam steerer may be adjusted based on information on the location of the viewer that is gathered from the camera. Other input-output devices may also be used in gathering information that is used in adjusting the beam steerer. For example, the beam steerer may be directed to deflect emitted light at a 45° angle in response to information from an accelerometer indicating that the display is in a horizontal orientation.

DETAILED DESCRIPTION

Figure 1:
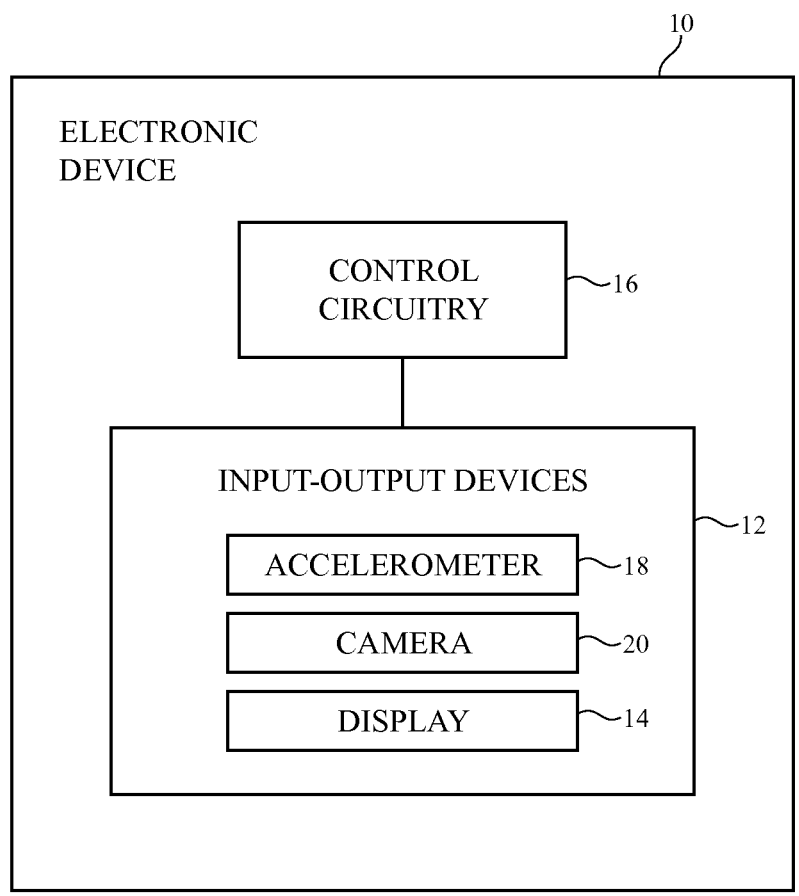
FIG. 1 is a diagram of an illustrative electronic device having a display in accordance with an embodiment.

An illustrative electronic device of the type that may be provided with an autostereoscopic display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras such as camera 20, sensors such as accelerometer 18 or other sensors that can detect the orientation of device 10 relative to the Earth and/or relative to a user, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14.

Display 14 may be a liquid crystal display, an organic light-emitting diode display, an electrophoretic display, an electrowetting display, or any other suitable type of display.

Figure 2:
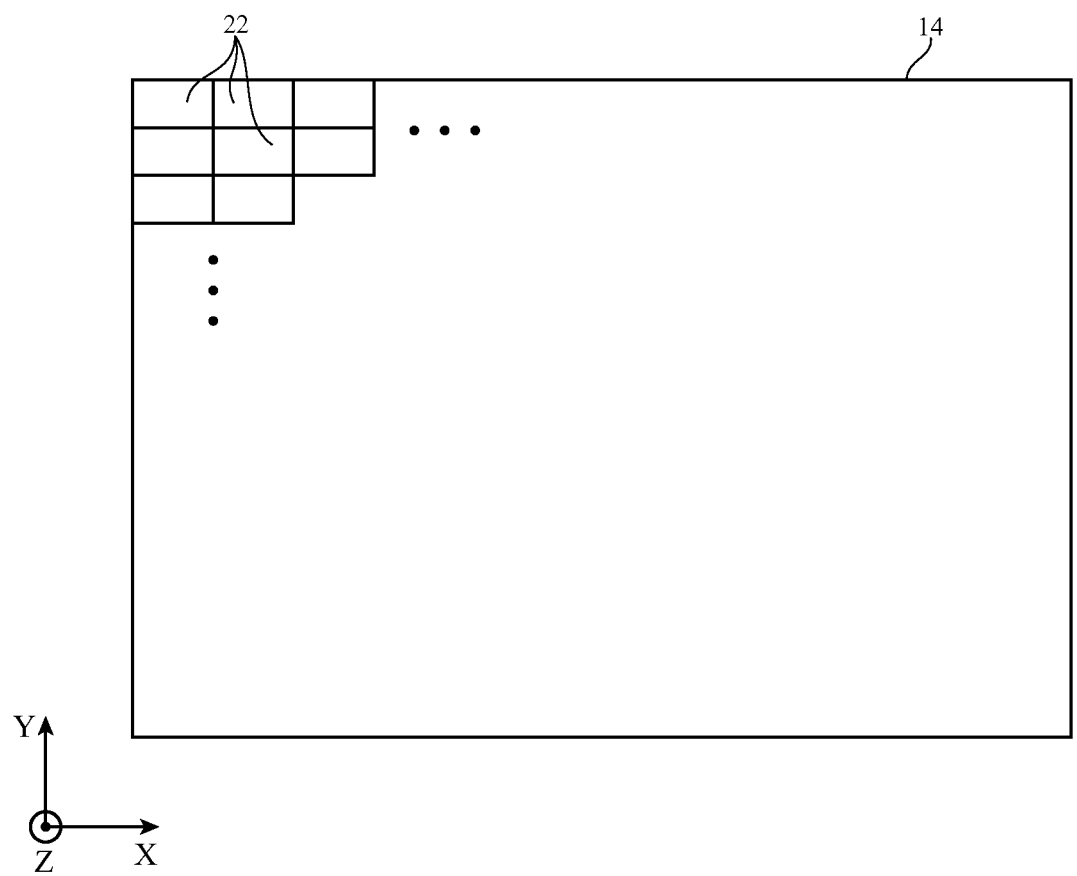
FIG. 2 is a diagram of an illustrative display in accordance with an embodiment.

Display 14 may include an array of pixels. For example, display 14 may include rows and columns of pixels 22, as shown in FIG. 2. There may be any suitable number of pixels 22 in display 14. As an example, there may be tens, hundreds, thousands, or more than thousands of rows and/or columns of pixels 22 in display 14.

Pixels 22 are arranged across the surface of display 14 in lateral dimensions X and Y and are therefore sometimes referred to as spatial pixels. When displaying an image on display 14, control circuitry 16 (FIG. 1) may control the amount of light that is emitted from each pixel 22.

Figure 3:
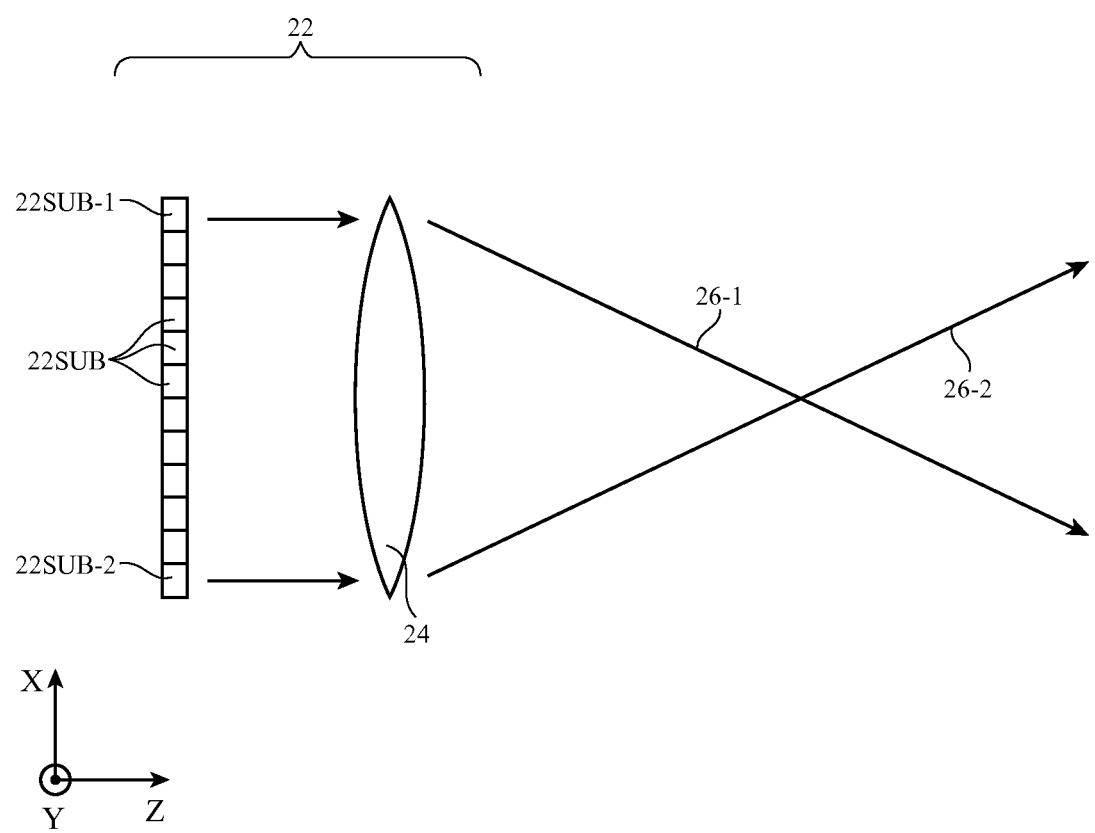
FIG. 3 is a diagram of an illustrative pixel in a display in accordance with an embodiment.

Three-dimensional images may be displayed for a user of device 10 (i.e., a viewer of display 14) by controlling the angles at which light rays are emitted from each pixel 22 and the intensities of each of these light rays. With one suitable arrangement, which may sometimes be described herein as an example, each pixel 22 may contain a two-dimensional array of subpixels 22SUB. Subpixels 22SUB emit light though optical structures such as lens structures 24, as shown in FIG. 3. Pixels 22SUB may be arranged in square arrays, rectangular arrays, or other suitable arrays. In the orientation of FIG. 3, subpixels 22SUB of pixel 22 are arranged in a two-dimensional array that lies in the X-Y plane (perpendicular to the page). Pixels 22SUB may be provided with more than one color to allow display 14 to display color images. For example, each pixel 22 may contain red, green, and blue subpixels.

The pattern with which subpixels 22SUB in a given pixel are illuminated is selected so that the pixel produces light rays with desired intensities over a range of respective angular orientations. The angles at which the light rays are emitted from pixel 22 are determined by the positions of the subpixels 22SUB within the subpixel array. Each subpixel 22SUB has a different respective location relative to lens structures (lens) 24 and the direction in which the light ray from each subpixel is emitted from pixel 22 varies as a function of the location of that subpixel within pixel 22. As an example, light from subpixel 22SUB-1 will follow the path of light beam 26-1, whereas light from subpixel 22SUB-2 will follow the path of light beam 26-2. Other subpixels can produce light with other angular orientations and separately controlled intensities. Using this type of arrangement, each pixel 22 may produce a pattern of light rays with a variety of different angular orientations and intensities, allowing pixels 22 to produce three-dimensional images for a viewer.

The maximum angular spread between light beams 26-1 and 26-2 (the outermost beams in this example) determines the angular range of emitted light for each pixel 22 and thereby limits the amount by which a viewer of display 14 can change position while being provided with a three-dimensional experience (e.g., to look around displayed objects). Additional angular resolution and angular range for display 14 can be achieved by expanding the number of rows and columns of subpixels 22SUB per pixel 22, but this tends to increase the size of pixels 22 and thereby reduces spatial resolution (i.e., the number of rows and columns of pixel 22 would be reduced by a corresponding amount). Accordingly, there is a tension between achieving high angular resolution and range to minimize vergence accommodation conflicts and achieving high spatial resolution to produce sharp images.

To enhance the overall angular range of display 14, display 14 can be provided with a beam steerer that provides coarse angular adjustment to the angle of light emitted from display 14. Fine angular changes (i.e., small angular movements of the viewer's head relative to display 14) may be accommodated by supplying appropriate image data to the subpixels 22SUB in each pixel 22 without changing the coarse deflection setting for the beam steerer.

Figure 4:
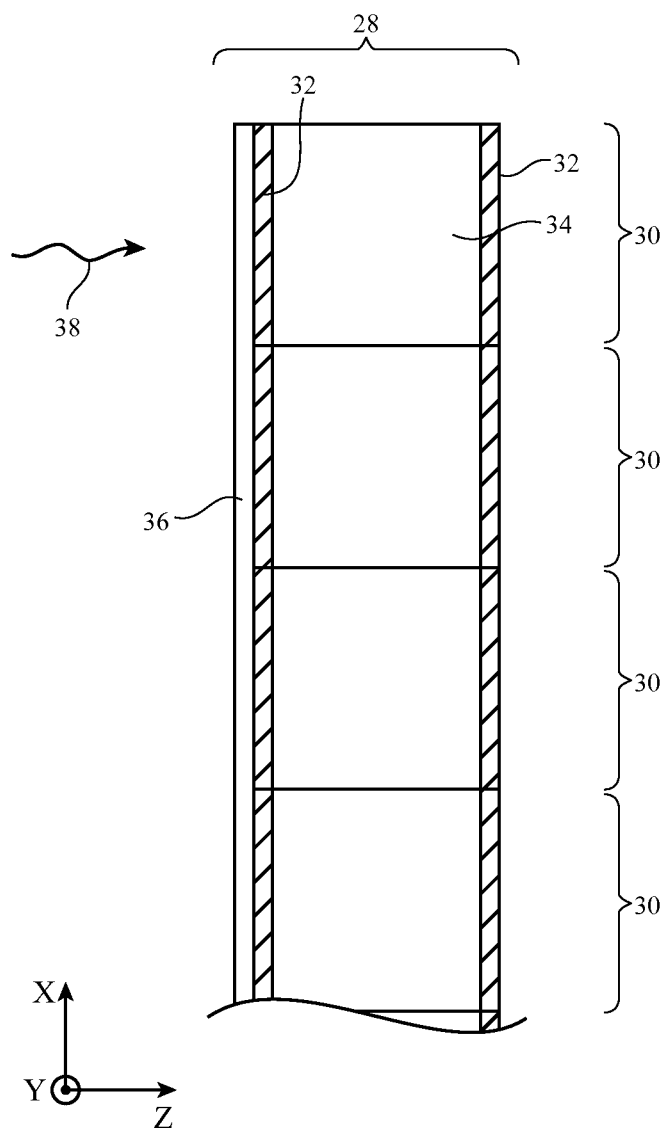
FIG. 4 is a cross-sectional view of an illustrative beam steering device in accordance with an embodiment.

Any suitable beam-steering equipment may be used to provide display 14 with beam steering capabilities. With one suitable arrangement, which is sometimes described herein as an example, display 14 may be provided with a liquid crystal beam steerer. An illustrative liquid crystal beam steerer is shown in FIG. 4. As shown in FIG. 4, beam steerer 28 may include a plurality of cells 30. Cells 30 may be arranged along dimension X (as an example). Each cell 30 may contain a layer of liquid crystal material 34 sandwiched between a pair of transparent electrodes 32 (e.g., electrodes formed from a transparent conductive material such as indium tin oxide on a transparent substrate such as glass or plastic). Polarizer 36 may be used to polarize emitted light 38 from pixels 22. During operation, control circuitry 16 may independently control the voltage that is applied to each cell 30. The index of refraction for light having the polarization state established by polarizer 36 can be varied for each cell 30 by adjusting the voltage across electrodes 32.

When it is desired to allow light 38 to pass straight through beam steerer 28, the same voltage V may be applied to each of cells 30. In this scenario, beam steerer 28 will have a uniform index of refraction and will not deflect light 38. This type of configuration for beam steerer 28 and display 14 may be used when a viewer is positioned directly in front of display 14 (i.e., when display 14 is centered directly in front of the viewer).

The viewer may not always remain directly in front of display 14. For example, a viewer may change position with respect to display 14 in order to "look around" objects being displayed in three dimensions. In a conventional display, the angular range of the display is limited by the angular range of pixels 22 (i.e., the maximum angular range of the display will be limited by the configuration of the array of subpixels 22SUB in each pixel). When a beam steerer is used, however, it is possible to provide coarse angular deflections for emitted light in addition to the fine angular deflections of the light rays emitted from the subpixels. For example, if a viewer changes position with respect to display 14 by an amount that is greater than the angular range of the array of pixels 22, coarse beam steering may be performed using beam steerer 28. Consider, as an example, a scenario in which pixels 22 produce three-dimensional images over an angular range of 20°. When the viewer changes angular position by 35° (as an example), the beam steerer can deflect the light from pixels 22 towards the viewer, thereby increasing the angular range for the display to more than 20°.

Figure 5:
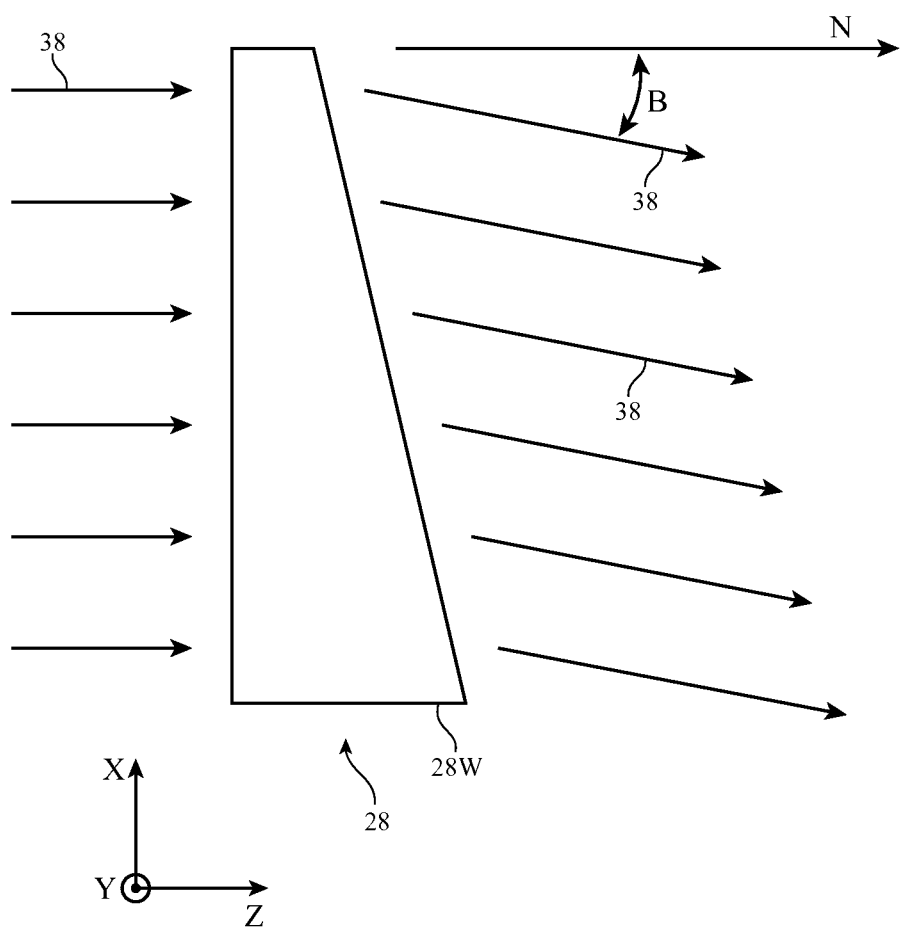
FIG. 5 is a diagram showing how a beam steering device of the type shown in FIG. 4 may create a virtual optical wedge that steers light being emitted from a display in accordance with an embodiment.

To steer light emitted from pixels 22, the indices of refraction of cells 30 can be configured so that beam steerer 28 exhibits a linearly varying index of refraction along dimension X. In this type of configuration, beam steerer 28 behaves optically like a wedge prism (see, e.g., optical wedge 28 W of FIG. 5). As shown in FIG. 5, light 38 can be deflected at an angle B with respect to display surface normal N. The angle B may be, for example, 20°, 25° 15°, 5-25°, 15-30°, less than 30°, more than 15°, or other suitable value. The angular range of pixels 22 without using beam steering may be 20°, 25° 15°, 5-25°, 15-30°, less than 30°, more than 15°, or other suitable value. By using beam steerer 28 to perform beam steering, the overall angular range of display 14 may be enhanced (e.g., to 40° or more, 60° or more, 80° or more, 90° or more, less than 70°, or other suitable amount).

Figure 6:
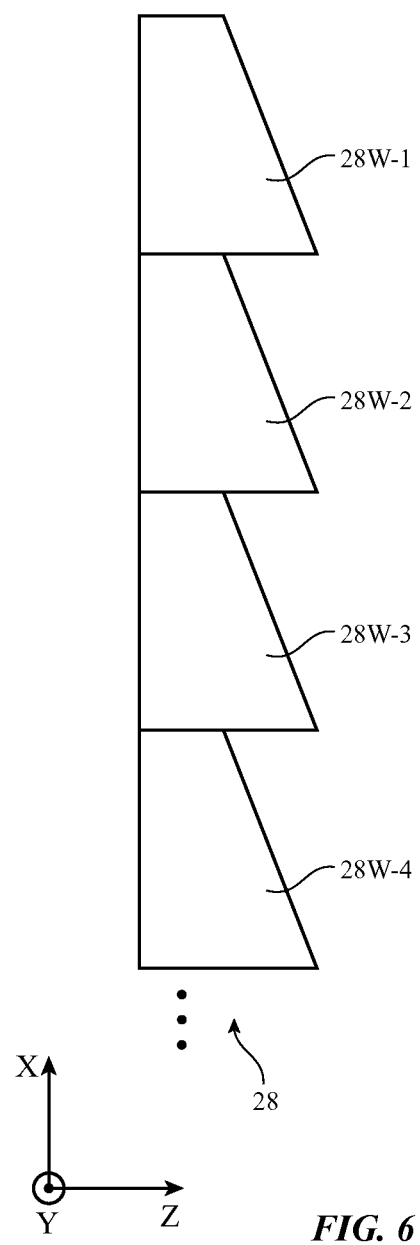
FIG. 6 is a diagram showing how a Fresnel arrangement may be used by the beam steering equipment of FIG. 4 in accordance with an embodiment.

If desired, a Fresnel-type arrangement may be used when creating index-of-refraction changes in cells 30 to steer light 38 (see, e.g., FIG. 6). In this type of arrangement, cells 30 are adjusted so that periodic wedge-shaped index-of-refraction changes are produced (effectively creating wedge prisms 28W-1, 28W-2, 28W-3, 28W-4 . . . ). This approach allows a desired amount of beam steering to be achieved while minimizing the maximum required index-of-refraction change for cells 30. Beam steerer 28 may be used to steer light in one or two dimensions.

Figure 7:
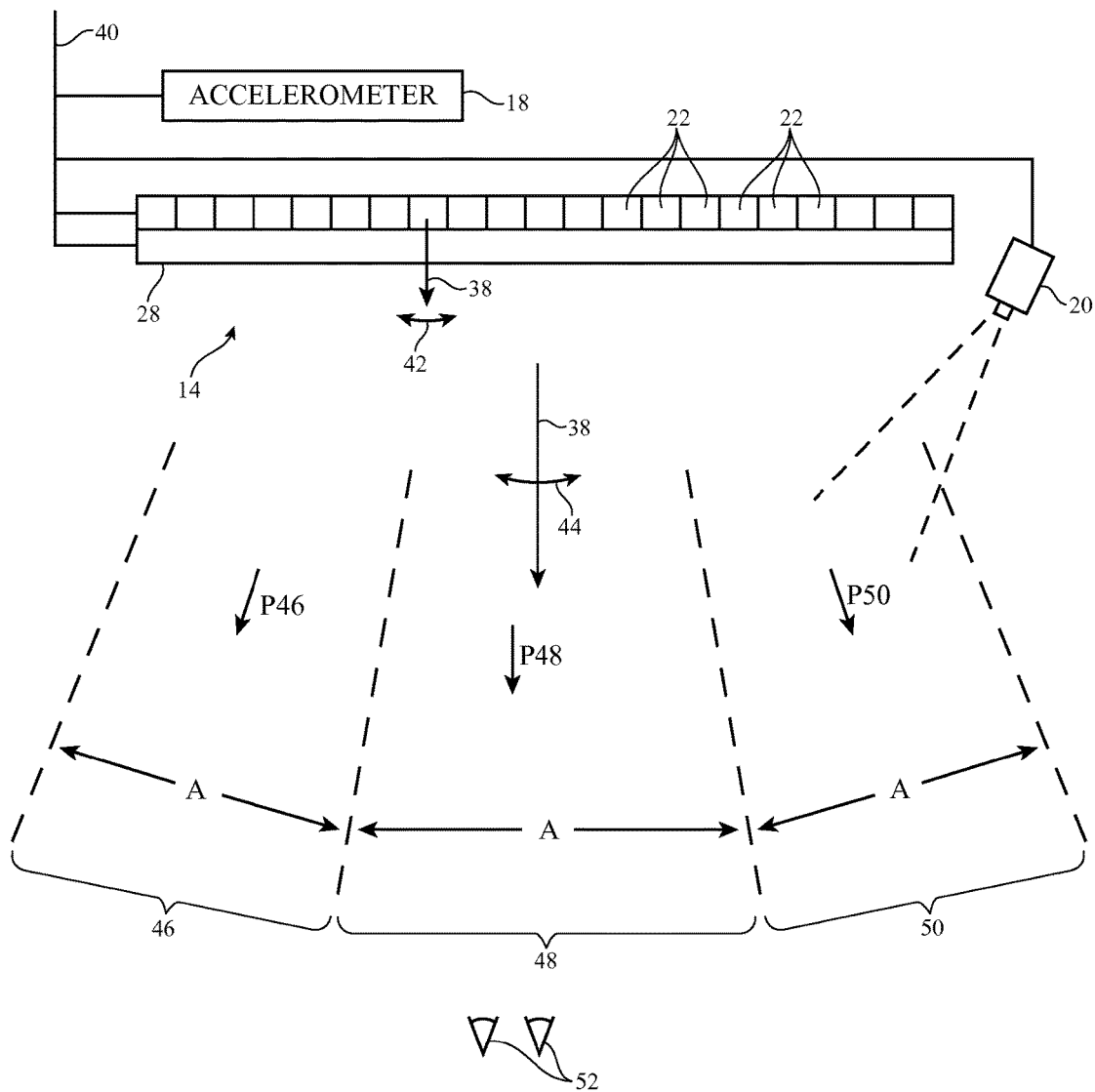
FIG. 7 is a diagram showing how an autostereoscopic display may include a beam steerer in accordance with an embodiment.

An illustrative configuration for display 14 that incorporates an array of pixels 22 and beam steerer 28 is shown in FIG. 7.

As shown in FIG. 7, beam steerer 28 may be interposed between pixels 22 and viewer 52. Signal path 40 may be coupled to control circuitry 16. Path 40 may be used to provide control signals to pixels 22 and beam steerer 28 (e.g., signals that direct pixels 22 to display a desired three-dimensional image and that control beam steerer 28 so that light 38 from display 14 that is associated with the three-dimensional image is steered towards viewer 52 as appropriate).

Pixels 22 may each contain an array of subpixels 22SUB. Subpixels 22SUB may be controlled so that emitted light 38 from each pixel 22 has desired angular orientations and intensities. The size of the array of subpixels 22SUB and the associated lens structures for the array determine the angular range over which a viewer can view three-dimensional images from pixels 22. This angular range, which is shown as angular range 42 in FIG. 7, may be, as an example, 20°. Beam steerer 28 may be controlled so that emitted light 38 is coarsely adjusted (i.e., to perform coarse angular adjustments 44). By using beam steerer 28, the angular range of display 14 can be expanded beyond the angular range of pixels 22.

Each pixel 22 may include an array of subpixels 22B and an associated lens 24 (e.g., a lens located at a lens focal distance fin front of the array of subpixels for collimating the light from those subpixels) as shown in FIG. 3 or pixels 22 may use other types of pixel structures to display three-dimensional images. For example, each subpixel 22SUB may have a diffraction grating that directs light for that subpixel in a different respective direction (in which case lenses 24 may be omitted).

In the illustrative configuration of FIG. 7, viewer 52 may be located in first region 46, second region 48, or third region 50. Control circuit 16 may gather information from input-output devices 12 to use in determining how to adjust beam steerer 28. For example, camera 20 can acquire images that reveal the location of viewer 52 (i.e., the eyes of viewer 52). This information can be used to track the position of viewer 52 relative to display 14. If the viewer is located in central region 48, beam steerer 28 can be adjusted so that light 38 is not deflected by beam steerer 28 (i.e., beam steerer 28 will allow light 38 to travel directly outward from pixels 22 along path P48 without any coarse beam deflection). If the viewer is located in left-hand region 46, beam steerer 28 can be adjusted so that light 38 is steered to the left and travels towards region 46 along path P46. In response to determining that the viewer is located in region 50, beam steerer 28 can be adjusted so that light 38 is steered to the right and travels towards region 50 along path P50.

Regardless of which region the viewer is located in (region 46, 48, or 50), subpixels 22SUB in each pixel are provided with data that allows each pixel 22 to emit light in a variety of different angular orientations so that a three-dimensional image is produced for the viewer. Movement of the viewer within each region is accommodated by pixels 22. Movement between regions is accommodated by using beam steerer 28 to steer emitted light from pixels 22 to the region in which the viewer is currently located.

To provide the viewer with a seamless three-dimensional experience, the image data that is being supplied to pixels 22 is preferably adjusted as the viewer transitions between regions. Consider, as an example, a viewer who is initially located in region 46. Control circuitry 16 uses camera 20 to monitor the location of the viewer. Upon determining that the viewer is in region 46, control circuitry 16 supplies display 14 with image data that is corresponds to a three-dimensional object viewed from the perspective of region 46. As the viewer moves about within region 46, the image data is not changed by control circuitry 16, but because pixels 22 emit light at different angles (using subpixels 22SUB), the viewer can view different portions of the three-dimensional object as the position of the viewer changes (i.e., the viewer can look around the edges of the three-dimensional object to view the object from different perspectives).

When control circuitry 16 determines that the viewer has moved from region 46 to region 48, beam steerer 28 can be adjusted so that light 38 passes along path P48. Control circuitry 16 can also update the image data that is provided to pixels 22, so that pixels 22 present the viewer with an updated version of the three-dimensional object. This version of the displayed three-dimensional image is appropriate when viewing the object from the perspective of region 48. By updating both the setting of beam steerer 28 and the data set that is provided to pixels 22 in this way, the viewer can be presented with a three-dimensional object that can be viewed from a wide range of perspectives (i.e., the point of view of the viewer relative to the three-dimensional object may be anywhere in regions 46, 48, and 50 in this example).

In some situations, control circuitry 16 may use information from input-output devices such as accelerometer 18 in determining how to adjust display pixels 22 and/or beam steerer 28. For example, control circuitry 16 can gather data from accelerometer 18 that indicates whether display 14 is being held in an upright position (i.e., so that the plane of the display runs vertically) or is lying flat on a table or other surface (i.e., so that the plane of the display is horizontal). Control circuitry 16 can adjust the control signals that are supplied to display 14 accordingly. For example, if it is determined that display 14 is in a vertical orientation, beam steerer 28 can allow light 38 to be emitted directly outwards (parallel to the surface normal for display 14). If it is determined that display 14 is in a horizontal position, control circuitry 16 can conclude that display 14 is resting on a table top. In this orientation, control circuitry 16 can direct beam steerer 28 to steer emitted light 38 at a 45° angle, so that a viewer that is seated at the table can view the three-dimensional image. Other sensors may be used in adjusting display 14 if desired. The use of a camera to detect the position of the viewer and an accelerometer to detect the orientation of display 14 so that the position of the viewer can be inferred are merely illustrative examples of ways in which control circuitry 16 can adjust display 14.

Figure 8:
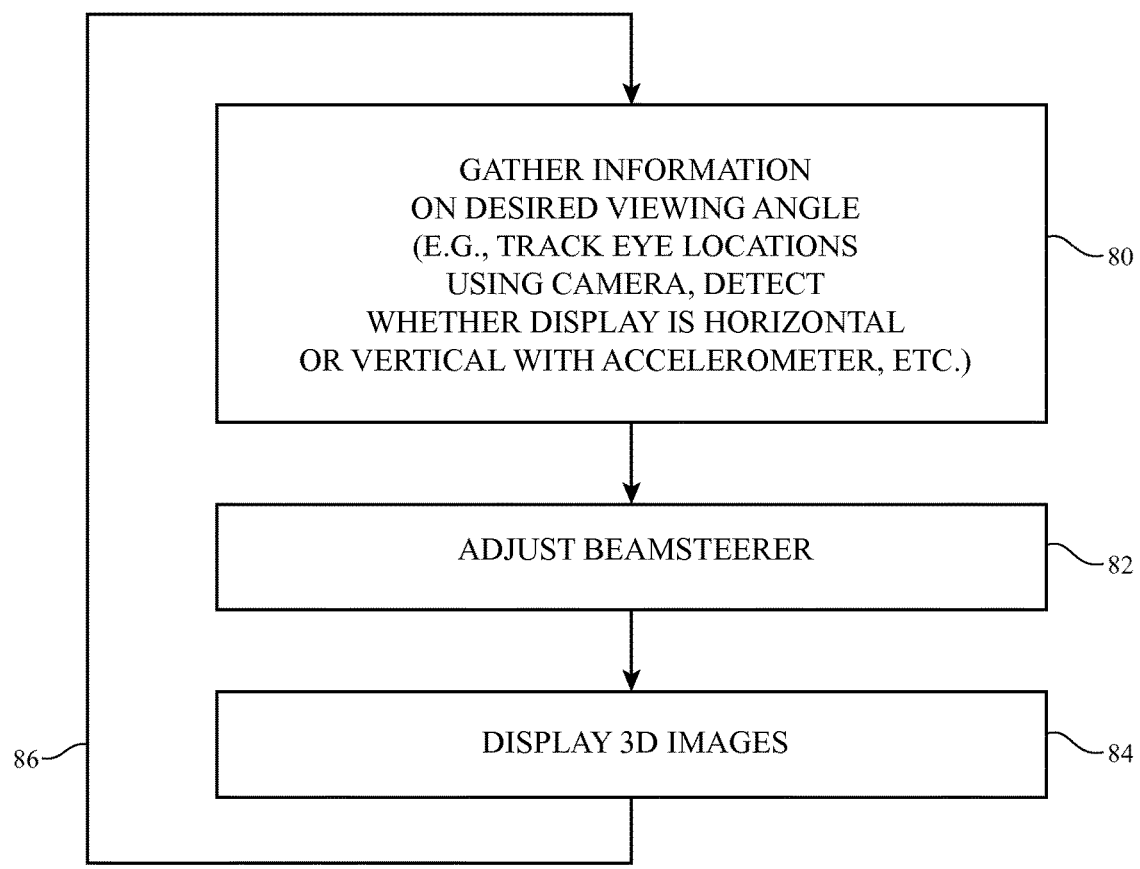
FIG. 8 is a flow chart of illustrative steps involved in operating a display in accordance with an embodiment.

A flow chart of illustrative steps involved in operating display 14 in device 10 is shown in FIG. 8.

At step 80, device 10 may gather information on the operating environment for display 14. For example, control circuitry 16 can use camera 20 to determine the location of the viewer relative to display 14. In a scenario of the type shown in FIG. 7, camera 20 can determine whether the user is located in region 46, 48, or 50. If desired, accelerometer data from accelerometer 18 and/or data from other input-output devices 12 in electronic device 10 may be used in gathering information on the position of viewer 52, the position of display 14, and other information to be used in adjusting display 14.

At step 82, the information that has been gathered by control circuitry 16 during the operations of step 80 may be used by control circuitry 16 to adjust beam steerer 28. Beam steerer 28 may, for example, be used to direct light from display 14 in the direction of path P46 if the viewer is in region 46 of FIG. 7, in the direction of path P48 if the viewer is in region 48 of FIG. 7, or in the direction of path P50 if the viewer is in region 50 of FIG. 7. If accelerometer 18 determines that device 10 is resting horizontally on a table top, the beam steerer may direct light from display 14 at a 45° angle towards a seated viewer. Beam steerer 28 may steer light from display 14 in one dimension (e.g., across the width of the display) or in two dimensions (across the width and/or height of the display).

At step 84, control circuitry 16 may supply the array of pixels 22 in display 14 (including subpixels 22SUB) with data that displays causes display 14 to display three-dimensional images for the viewer. Small angular movements of the viewer can be accommodated without using beam steerer 28 and without adjusting the data that is provided to display 14 to display three-dimensional images. During these small angular movements (e.g., movements of less than 20° in the present example), subpixels 22SUB cause three-dimensional images to be displayed.

When the viewer changes position by a larger amount (e.g., an amount sufficient to transition between regions 46, 48, and 50 of FIG. 7), the data that is supplied to pixels 22 may be adjusted accordingly. The data set that is supplied to pixels 22 may, for example, be updated in response to detection of the position of the viewer with camera 20 (i.e., whether the user is in region 46, 48, or 50) or other information from input-output devices 12. By updating the data set supplied to pixels 22 based on which region the viewer is located in, the three-dimensional content that is being displayed for the viewer may be customized to be appropriate for the point-of-view of a viewer that is located at the viewer's detected location. If, for example, the user is located in region 46, display 14 may present a three-dimensional object that is appropriate for viewing from the point-of-view of an observer located in region 46. If the user is in region 48, the three-dimensional object may have an appearance appropriate for viewing from the point-of-view of an observer in region 48. If the user is in region 50, the three-dimensional object may have an appearance appropriate for viewing from the point-of-view of an observer in region 50.

As indicated by line 86, the operations of steps 80, 82, and 84 may be performed continuously so that the viewer is presented with high-quality three-dimensional images over a wide range of viewing angles.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   an autostereoscopic display comprising an array of pixels that displays three-dimensional images to a viewer, wherein each of the pixels has an array of subpixels and structures through which light from the subpixels is emitted at a plurality of different angles;
   a beam steerer that is interposed between the array of pixels and the viewer, wherein an index of refraction of the beam steerer is adjustable to redirect the light from the subpixels towards the viewer; and
   an accelerometer, wherein the control circuitry adjusts the beam steerer based on information from the accelerometer.

2. The electronic device defined in claim 1 further comprising:
   a camera; and
   control circuitry that gathers information from the camera on where the viewer is located and that adjusts the beam steerer based on where the viewer is located.

3. The electronic device defined in claim 2 wherein the beam steerer comprises a liquid crystal beam steerer and wherein the beam steerer deflects light from the display towards the viewer.

4. The electronic device defined in claim 2 wherein the control circuitry provides the autostereoscopic display with different sets of data for the array of pixels depending on wherein the viewer is located.

* * * * *